US008655523B2

(12) United States Patent
Fukushiro et al.

(10) Patent No.: US 8,655,523 B2
(45) Date of Patent: Feb. 18, 2014

(54) VEHICLE CONTROL DEVICE AND CONTROL METHOD OF VEHICLE CONTROL DEVICE

(75) Inventors: Eiji Fukushiro, Nagoya (JP); Koji Yamamoto, Okazaki (JP); Toshiya Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 801 days.

(21) Appl. No.: 12/449,453

(22) PCT Filed: Jul. 25, 2008

(86) PCT No.: PCT/JP2008/063377
§ 371 (c)(1),
(2), (4) Date: Aug. 7, 2009

(87) PCT Pub. No.: WO2009/057363
PCT Pub. Date: May 7, 2009

(65) Prior Publication Data
US 2010/0168943 A1  Jul. 1, 2010

(30) Foreign Application Priority Data
Oct. 29, 2007  (JP) .................................. 2007-279929

(51) Int. Cl.
*B60L 9/00*  (2006.01)

(52) U.S. Cl.
USPC .......................................................... 701/22

(58) Field of Classification Search
USPC ........... 701/22; 318/139; 180/65.275, 65.285, 180/65.29; 903/907
See application file for complete search history.

(56) References Cited

U.S. PATENT DOCUMENTS

| 5,471,384 | A | 11/1995 | Nakashima et al. |
| 6,651,759 | B1 * | 11/2003 | Gruenwald et al. ..... 180/65.245 |
| 7,099,756 | B2 * | 8/2006 | Sato ................................ 701/22 |
| 7,212,891 | B2 * | 5/2007 | Sato ................................ 701/22 |
| 7,252,165 | B1 * | 8/2007 | Gruenwald et al. ........ 180/65.25 |
| 7,529,608 | B2 * | 5/2009 | Shimizu .......................... 701/70 |
| 7,933,695 | B2 * | 4/2011 | Yamaguchi ..................... 701/22 |
| 7,973,505 | B2 * | 7/2011 | Suhama et al. ............... 318/432 |
| 8,025,115 | B2 * | 9/2011 | King et al. ............... 180/65.275 |
| 8,041,474 | B2 * | 10/2011 | Lemke et al. ................... 701/22 |
| 8,046,123 | B2 * | 10/2011 | Egami et al. .................... 701/22 |
| 2005/0023055 | A1 * | 2/2005 | Imazu et al. ................. 180/65.2 |

(Continued)

FOREIGN PATENT DOCUMENTS

| JP | A-06-105588 | 4/1994 |
| JP | A-10-248106 | 9/1998 |

(Continued)

*Primary Examiner* — John Q Nguyen
*Assistant Examiner* — Jordan S Fei
(74) *Attorney, Agent, or Firm* — Oliff PLC

(57) ABSTRACT

A vehicle control device (10) comprises a driving device (20) including an engine (22) and a rotary electric machine (24), a power circuit (30) connected to the rotary electric machine (24), a control part (50), and an ecoswitch (42). The CPU (52) of the control part (50) comprises a low fuel consumption travel instruction judgment module (60) for judging on or off of the ecoswitch (42), an operation condition switch module (62) for switching the operation condition of the rotary electric machine on the basis of the on or off of the ecoswitch (42), an engine state judgment module (64) for judging whether or not the engine (22) is in a started state or a stopped state, and a damping control module (68) for carrying out damping control when the engine (22) is stalled or stopped.

9 Claims, 7 Drawing Sheets

(56) References Cited

U.S. PATENT DOCUMENTS

| | | | |
|---|---|---|---|
| 2005/0075766 A1* | 4/2005 | Kobayashi et al. | 701/22 |
| 2009/0152027 A1* | 6/2009 | Kusaka et al. | 180/65.28 |
| 2010/0131136 A1* | 5/2010 | Ichikawa | 701/22 |
| 2010/0305796 A1* | 12/2010 | Aoki et al. | 701/22 |
| 2010/0332063 A1* | 12/2010 | Saeki et al. | 701/22 |
| 2011/0093151 A1* | 4/2011 | Kojima et al. | 701/22 |
| 2011/0282530 A1* | 11/2011 | Suhama et al. | 701/22 |

FOREIGN PATENT DOCUMENTS

| | | |
|---|---|---|
| JP | A-2000-050686 | 2/2000 |
| JP | A-2004-064803 | 2/2004 |
| JP | A-2005-155862 | 6/2005 |
| WO | WO 2007060853 A1 * | 5/2007 |

* cited by examiner

VEHICLE CONTROL DEVICE AND CONTROL METHOD OF VEHICLE CONTROL DEVICE

TECHNICAL FIELD

The present invention relates to a vehicle control device and a control method of the vehicle control device, and more particularly, to a vehicle control device and a control method of the vehicle control device that control a vehicle having a rotating electric device according to a fuel-efficient running command from the user.

BACKGROUND ART

Recently, so-called electric-motor vehicles, such as environmentally benign electric automobiles, hybrid automobiles, and fuel-cell automobiles, have attracted attention. Saving energy by improving fuel consumption is preferable, from the viewpoint of friendliness to the environment. Improving fuel consumption by restricting the power performance of the vehicle or by restricting air-conditioning may sacrifice ease of operation of a vehicle and comfort in the interior space. Therefore, it is preferable to enable the driver to choose an option to save energy by means of a simple operation. To this end, the vehicle is provided with a switch or the like that issues a fuel-efficient running command to the control element thereof. This switch is also called "an eco-mode switch" or simply "an eco-switch."

For example, Patent Document 1 discloses a control device of an electric automobile capable of switching between a normal mode and an economy mode. According to this control device, power consumption is saved by setting a torque command value of the running motor on the drive side in the economy mode to be 60% that in the normal mode. When the actual acceleration or required acceleration in the economy mode is 80% or less, hill-climbing torque is added, and when the actual acceleration or required acceleration is 90% or higher, hill-climbing torque is subtracted.

As a technique relevant to the invention, Patent Document 2 describes a vehicle transmission control device equipped with a plurality of drive sources. According to this control device, when the clutch is disengaged during gear-shifting, no drive force of the engine is transmitted and the driver feels a slowdown, and because of this a drive force is compensated for by an electric motor serving as a second drive source. In a case where the amount of reduction in compensating torque is greater than a predetermined reference torque, the control mode is switched to the rectangular wave control, because torque becomes insufficient when the control mode for the inverter is the normal sine wave control. This reference describes that the sine wave control achieves low vibration and low noise, but, at a modulation factor of 0.61, whereas the rectangular wave control can achieve high torque at a modulation factor of 0.78.

Patent Document 1: JP-A-10-248106
Patent Document 2: JP-A-2005-155862

SUMMARY OF INVENTION

Technical Problem

According to the background art described above, power consumption is reduced by suppressing a torque command to the running motor, which is a rotating electric device, with the use of the eco-switch, so that fuel-efficiency can be enhanced.

Incidentally, various driving states can occur even when the eco-switch is ON. For example, during the eco-switch ON period the engine may be started, or the engine that was started and is now operating may be stopped. Vibrations are often generated when the engine is started or stopped. However, in order to deal with various driving states during the eco-switch ON period, merely suppressing the torque command to the rotating electric device as above is insufficient.

An object of the invention is to provide a vehicle control device and a control method of the vehicle control device capable of performing control suitable to a driving state of the vehicle during the eco-switch ON period. Another object of the invention is to provide a vehicle control device and a control method of the vehicle control device capable of suppressing vibrations when the engine is started or stopped during the eco-switch ON period.

Solution to Problem

A vehicle control device of the invention includes: a drive element having a rotating electric device and a power supply device connected to the rotating electric device; an obtaining element to obtain a fuel-efficient running command from a user; a memory device that stores a normal operation condition map of the rotating electric device for allowing a step-up converter in the power supply device to operate normally and a restricted operation condition map of the rotating electric device for allowing the step-up converter to operate in a restricted manner; and a control element that controls the drive element. The control element includes a fuel-efficient running command determination part to determine whether the fuel-efficient running command has been obtained, and a switching part to switch an operation condition of the rotating electric device between operation according to the restricted operation condition map when the fuel-efficient running command has been obtained and operation according to the normal operation condition map when the fuel-efficient running command has not been obtained.

In the vehicle control device of the invention, preferably, the memory device stores as the normal operation condition map an operation condition map having a wider range of sine wave control than that of the restricted operation condition map, and as the restricted operation condition map an operation condition map having a wider range of rectangular wave control than that of the normal operation condition map.

In the vehicle control device of the invention, preferably, the control element includes an engine start determination part to determine whether an engine start request has been issued while the fuel-efficient running command has been obtained, and a start-time damping control part to, when the engine start request has been issued, performing damping control under the sine wave control by temporarily switching the operation condition of the rotating electric device from operation according to the restricted operation condition map to operation according to the normal operation condition map.

In the vehicle control device of the invention, preferably, the start-time damping control part determines, when the engine start request has been issued, whether an operation state of the rotating electric device is within the range of the rectangular wave control or within the range of the sine wave control, and when the operation state is within the range of the rectangular wave control, performs the damping control under the sine wave control by temporarily switching the operation condition of the rotating electric device from operation according to the restricted operation condition map to operation according to the normal operation condition map, and performs the damping control directly without switching the operation condition when the operation state is within the range of the sine wave control range.

In the vehicle control device of the invention, preferably, the control element includes an engine stop determination part to determine whether an engine stop request has been issued while the fuel-efficient running command has been obtained, and a stop-time damping control part to, when the engine stop request has been issued, perform the damping control under the sine wave control by temporarily switching the operation condition of the rotating electric device from operation according to the restricted operation condition map to operation according to the normal operation condition map.

In the vehicle control device of the invention, preferably, the stop-time damping control part determines, when the engine stop request has been issued, whether an operation state of the rotating electric device is within the range of the rectangular wave control or within the range of the sine wave control, and when the operation state is within the range of the rectangular wave control, performs the damping control under the sine wave control by temporarily switching the operation condition of the rotating electric device from operation according to the restricted operation condition map to operation according to the normal operation condition map, and performs the damping control directly without switching the operation condition when the operation state is within the range of the sine wave control.

In the vehicle control device of the invention, preferably, the control element includes a delay permission determination part to determine whether an engine start is to be delayed when the engine start request has been issued while the fuel-efficient running command has been obtained, and the start-time damping control part switches the operation condition of the rotating electric device using a predetermined delay condition that has been set in response to accelerator opening for an engine start when a delay is permitted by the delay permission determination part.

In the vehicle control device of the invention, preferably, the stop-time damping control part switches the operation condition of the rotating electric device after an engine stop is delayed under a predetermined condition.

Advantageous Effects of Invention

According to the configuration described above, the vehicle control device stores the normal operation condition map of the rotating electric device for allowing the step-up converter in the power source device to operate normally and the restricted operation condition map of the rotating electric device for allowing the step-up converter to operate in a restricted manner. The operation condition of the rotating electric device is switched between operation according to the restricted operation condition map when the fuel-efficient running command from the user has been obtained and operation according to the normal operation condition map when the fuel-efficient running command has not been obtained. Accordingly, the operation conditions of the rotating electric device are distinguished between that in a state where the eco-switch, which is for issuing the fuel-efficient running command, is ON and that in the other states. Because the operation condition of the rotating electric device is set according to the restricted operation condition map for allowing the step-up converter to operate in a restricted manner when the eco-switch is ON, fuel efficiency can be achieved.

Also, in the vehicle control device, an operation condition map having a wider range of sine wave control than that in the restricted operation condition map is used as the normal operation condition map, and an operation condition map having a wider range of rectangular wave control than that in the normal operation condition map is used as the restricted operation condition map. Accordingly, insufficient torque can be compensated for by the rectangular wave control under the restricted operation condition.

Also, in the vehicle control device, a determination is made as to whether an engine start request has been issued while the fuel-sufficient running command has been obtained. When an engine start request has been issued, the damping control is performed under the sine wave control by temporarily switching the operation condition of the rotating electric device from operation according to the restricted operation condition map to operation according to the normal operation condition map. Moreover, in the vehicle control device, a determination is made as to whether an engine stop request has been issued while the fuel-efficient running command has been obtained. When an engine stop request has been issued, the damping control is performed under the sine wave control by temporarily switching the operation condition of the rotating electric device from operation according to the restricted operation condition map to operation according to the normal operation condition map.

An example of the damping control is a control on the magnitude of torque of the rotating electric device in association with a cycle of the expansion and compression strokes of the engine. In this case, when the control of the rotating electric device is the rectangular wave control, it becomes difficult to perform delicate control as above. Accordingly, the damping control as above is performed under the sine wave control. According to the above configuration, in a case where the engine is started or the engine is stopped while the eco-switch is ON and the control is performed under the restricted operation condition having a wider range of the rectangular wave control, the operation condition is temporarily returned to the control under the normal operation condition. The damping control is thus performed under the sine wave control. Hence, even when the engine is started or stopped while the eco-switch is ON, the resulting vibrations can be suppressed.

Also, when an engine start request is issued, a determination is made as to whether the operation state of the rotating electric device is within the range of the rectangular wave control or within the range of the sine wave control. When the operation state is within the range of the rectangular wave control, the damping control is performed under the sine wave control by temporarily switching the operation condition of the rotating electric device to operation according to the normal operation condition map. When the operation state is within the range of the sine wave control, the damping control is performed directly without switching the operation condition. Furthermore, when an engine stop request is issued, a determination is made as to whether the operation state of the rotating electric device is within the range of the rectangular wave control or within the range of the sine wave control. When the operation state is within the range of the rectangular wave control, the damping control is performed under the sine wave control by temporarily switching the operation condition of the rotating electric device to operation according to the normal operation condition map. When the operation state is within the range of the sine wave control, the damping control is performed directly without switching the operation condition. Accordingly, when the operation state is already within the range of the sine wave control, the engine can be started or stopped immediately.

Also, in the vehicle control device, when an engine start request is issued while the fuel-efficient running command has been obtained, a determination is made as to whether the engine start is to be delayed. When the engine start is to be delayed, the operation condition of the rotating electric device is switched using the predetermined delay condition that has been set in response to the accelerator opening for an engine start. Additionally, in the vehicle control device, the operation condition of the rotating electric device is switched after the engine stop is delayed under the predetermined condition. It thus becomes possible to secure a time to switch from the restricted operation condition to the normal operation condition. Moreover, because the delay condition corresponding to the accelerator opening is used, for example, the delay time is short, or zero in some cases, when the accelerator opening is large, so that the operation condition of the rotating electric device can be switched. The power performance of the engine can be thus secured.

REFERENCE SIGNS LIST

10: vehicle control device, 20: drive device, 22: engine, 24: rotating electric device, 30: power supply circuit, 32: battery device, 34 and 38: smoothing capacitor, 36: voltage transducer, 40: inverter circuit, 42: eco-switch, 44: accelerator opening sensor, 46: vehicle speed sensor, 50: control element, 52: CPU, 54: memory device, 60: fuel-efficient running command determination module, 62: operation condition switching module, 64: engine state determination module, 66: engine start delay permission determination module, 68: damping control module, 70, 72, 74, 80, 82, 84, 86, and 88: operation regions.

DETAILED DESCRIPTION OF EMBODIMENTS

Hereinafter, embodiments of the invention will be described in detail by reference to the drawings. Hereinafter, a motor and generator incorporated into a vehicle will be described as a rotating electric device. However, a component merely having a capability of a motor or a component merely having a capability of an electric generator may be used as well. More than one rotating electric device may be incorporated into the vehicle. In addition, a configuration having a rechargeable battery, a voltage transducer, and an inverter circuit will be described as the configuration of a power supply circuit. The configuration, however, may have components other than the foregoing; for example, a low-voltage DC/DC converter. It should be understood that a voltage value or the like specified in the following is a mere example for ease of description and can be changed as needed according to the specifications of a vehicle or the like.

First Embodiment

Figure 1:
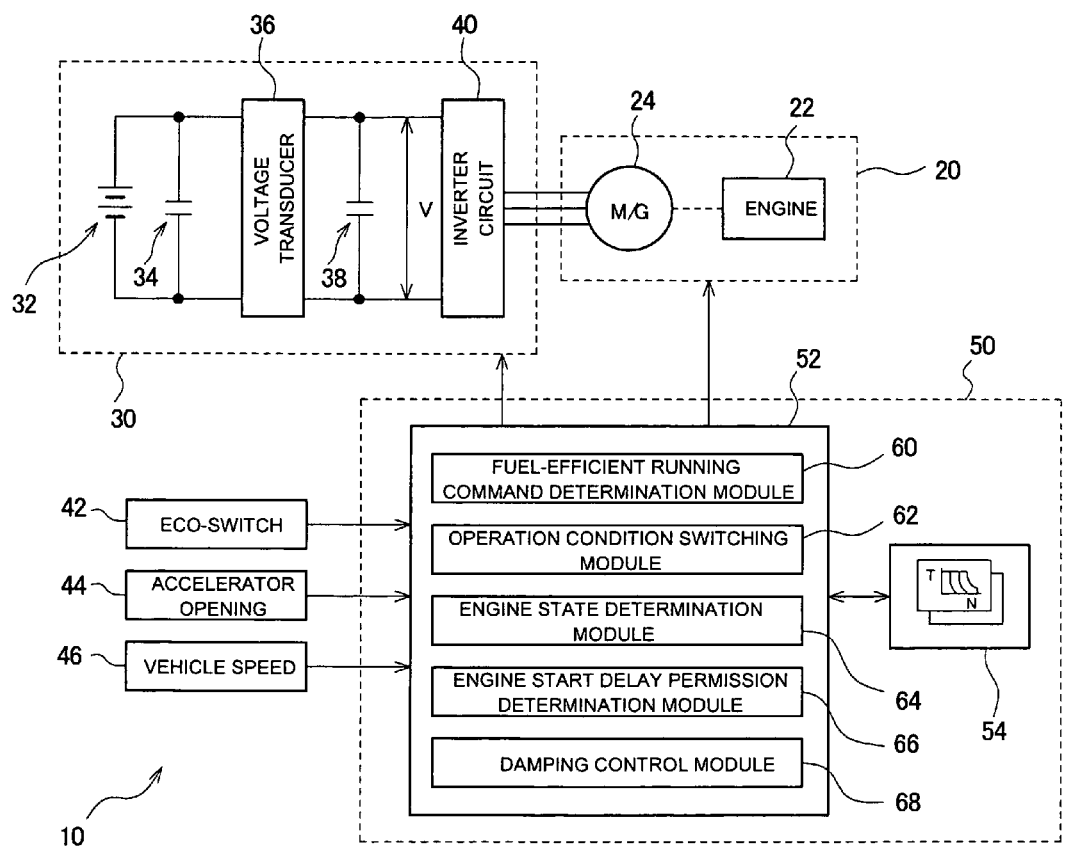
FIG. 1 is a view showing the configuration of a vehicle control device according to one embodiment of the invention.

FIG. 1 is a view showing the configuration of a vehicle control device 10. The vehicle control device 10 is a system that controls a vehicle incorporating an engine and a rotating electric device. Herein, in particular it has a capability of performing control suitable to a driving status of a vehicle when the eco-switch is turned ON. More specifically, it has a capability of performing control suitable to a case where the engine is started or stopped while the eco-switch is ON.

The vehicle control device 10 includes a drive device 20 having an engine 22 and a rotating electric device 24; a power supply circuit 30 electrically connected to the rotating electric device 24; and a control element 50. Also, an eco-switch 42, an accelerator opening sensor 44, and a vehicle speed sensor 46 are electrically connected to the control element 50. When attention is paid to the rotating electric device 24, the rotating electric device 24 and the power supply circuit 30 can be collectively referred to as a rotating electric device drive element.

The engine 22 in the drive device 20 is an internal combustion engine and has a capability of driving the drive wheels of the vehicle using its own output and also driving the rotating electric device 24 so as to generate electric power. The rotating electric device 24 is a motor and generator (M/G) incorporated into the vehicle. It is a three-phase synchronous rotating electric device that functions as a motor with supply of electric power and functions as an electric power generator during braking.

The power supply circuit 30 is a circuit that is electrically connected to the rotating electric device 24, which is a motor and generator. It has a capability of supplying electric power to the motor and generator when it functions as a drive motor, or a capability of charging a battery device by receiving regenerative electric power when the motor and generator functions as an electric power generator.

The power supply circuit 30 includes a battery device 32, which is a rechargeable battery; a smoothing capacitor 34 on the battery device side; a voltage transducer 36; a smoothing capacitor 38 on the step-up side; and an inverter circuit 40.

As the battery device 32, for example, a lithium ion assembly battery, a nickel-hydrogen assembly battery, or a capacitor each having a terminal voltage of about 200 V can be used.

The voltage transducer 36 is a circuit having a capability of boosting a voltage on the battery device 32 side to, for example, about 650 V by utilizing the energy accumulating function of a reactor, and is also called a step-up converter. The voltage transducer 36 has an interactive capability, and also functions to step down a high voltage on the inverter circuit 40 side to a voltage suitable to the battery device 32 when electric power from the inverter circuit 40 side is supplied to the battery device 32 side as charging electric power. In FIG. 1, a high voltage output side of the voltage transducer 36 is indicated by a boost voltage "V".

The inverter circuit 40 is a circuit having a capability of converting high-voltage DC power to AC three-phase drive power that is supplied to the motor and generators connected to each phase, and an opposite capability of converting AC three-phase regenerative power from the motor and generator to high-voltage DC charging power.

The eco-switch 42 is an operation element that the user operates optionally, and is a switch having a capability of outputting a fuel-efficient running command signal indicating that the user wishes fuel-efficient running when it is turned ON. The eco-switch 42 can be provided, for example, at an appropriate position near the driver's seat. A state of the eco-switch 42; that is, whether it is in an ON state or an OFF state, is transmitted to the control element 50.

The accelerator opening sensor 44 is a detection member for detecting the opening of the accelerator, which is an operation member that the user operates as he desires. Herein, a component identified by the name "sensor" is used. It should be understood, however, that any means other than a typical detection device is available, so long as it is capable of transmitting the opening degree of the accelerator to the control element 50.

The vehicle speed sensor 46 has a capability of transmitting a speed of the vehicle to the control element 50. Again, a component identified by the name "sensor" is used. It should be understood, however, that any means other than a typical detection device is available, so long as it is capable of transmitting a speed state of the vehicle to the control element 50.

The control element 50 has a capability of controlling an operation of the rotating electric device 24 incorporated into the vehicle so as to suit the operation state of the engine 22 through the control of the power supply circuit 30. In particular, it has a capability of controlling the operation when the engine 22 is started or stopped while the eco-switch 42 is ON through the control of the power supply circuit 30 when the eco-switch 42 is turned ON.

The control element 50 is formed by including a CPU 52, a memory device 54 that stores programs, and so forth. It also includes an interface circuit for effecting communications among the eco-switch 42, the accelerator opening sensor 44, and the vehicle speed sensor 46 as the need arises. These components are interconnected via an internal bus. The control element 50 as above can be formed of a computer or the like that can be suitably incorporated into the vehicle. The capability of the control element 50 can be a part of the capability of another computer incorporated into the vehicle. For example, a hybrid Electronic Control Unit or the like that controls the overall vehicle may have the capability of the control element 50.

Besides storing programs as described above, the memory device 54, in particular, stores a map relating to an operation condition of the rotating electric device 24. The map relating to the operation condition of the rotating electric device 24 is actually a map relating to an operation condition of the power supply circuit 30 connected to the rotating electric device 24. More specifically, it includes a map relating to a change of the upper limit value of the boost voltage of the voltage transducer 36 and a map relating to a change of the control modes of the inverter circuit 40 between the sine wave control and the rectangular wave control, in response to the ON/OFF switching of the eco-switch 42.

Data including these maps are operation condition data of the rotating electric device 24, and the data used when the eco-switch 42 is OFF are referred to as a normal operation condition map and the data used when the eco-switch 42 is ON are referred to as a restricted operation condition map. Therefore, the memory device 54 stores both the normal operation condition map and the restricted operation condition map.

Figure 2:
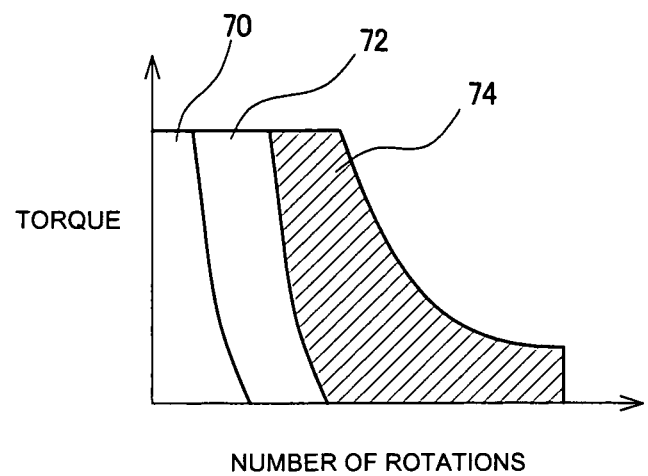
FIG. 2 is a view showing an example of a normal operation condition map according to the embodiment of the invention.
Figure 3:
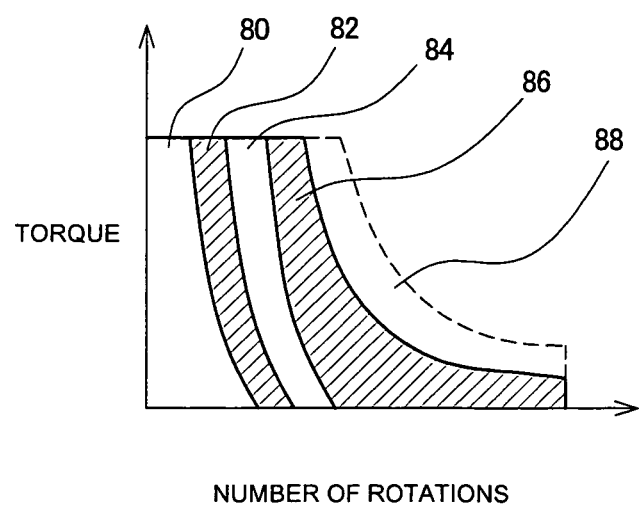
FIG. 3 is a view showing an example of a restricted operation condition map according to the embodiment of the invention.

FIG. 2 is a view showing an example of the normal operation condition map. FIG. 3 is a view showing an example of the restricted operation condition map. Hereinafter, descriptions will be given using reference numerals in FIG. 1. Referring to FIG. 2 and FIG. 3, the abscissa indicates the number of rotations of the rotating electric device, 24 and the ordinate indicates the torque of the rotating electric device 24. In other words, both the normal operation condition map and the restricted operation condition map are maps indicating a state of an operation condition in the characteristic of torque versus the number of rotations of the rotating electric device 24. Descriptions will be given on the assumption that the memory device 54 pre-stores these maps. It is, however, sufficient that the operation condition data of the rotating electric device 24 are read out with the use of an appropriate retrieval key, and the memory device 54 may store, instead of the maps, a data group in which data are stored hierarchically.

As is shown in FIG. 2, the operation state of the rotating electric device 24 is divided into three regions in the normal operation condition map applied when the eco-switch 42 is OFF. An operation region 70 is a region in which the voltage transducer 36 is deactivated and a voltage of the battery device 32 is supplied to the inverter circuit 40 so that the PWM (Pulse Width Modulation) control is performed in the inverter circuit 40. An operation region 72 is a region in which the voltage transducer 36 boosts the voltage according to the driving state of the vehicle and the boost voltage V is supplied to the inverter circuit 40, so that the PWM control is performed in the inverter circuit 40. The boost voltage V is set between an output voltage of the battery device 32 and the normal upper limit voltage, which is the step-up upper limit value of the voltage transducer 36 under the control of the control element 50 according to the driving state of the vehicle.

In the example above, descriptions were given on the assumption that the output voltage of the battery device 32 is about 200 V and the boosted voltage of the voltage transducer 36 is about 650 V. About 650 V is the step-up upper limited value of the voltage transducer 36 and is defined as the normal upper limit voltage.

As can be understood from the PWM control being performed in the operation regions 70 and 72, the sine wave control is performed in these regions. An operation region 74 is a region in which the upper limit voltage, which is the voltage boosted by the voltage transducer 36 to the step-up upper limit value, is supplied to the inverter circuit 40 so that the rectangular wave control is performed in the inverter circuit 40. In FIG. 2 and FIG. 3, regions where the rectangular wave control is performed are diagonally shaded.

As shown in FIG. 3, the operation state of the rotating electric device 24 is divided into five regions in the restricted operation condition map applied when the eco-switch 42 is ON. As with the operation region 70 in FIG. 2, an operation region 80 is a region in which the voltage transducer 36 is deactivated and a voltage of the battery device 32 is supplied to the inverter circuit 40 so that the PWM control is performed in the inverter circuit 40. An operation region 82 is a region in which the voltage transducer 36 is deactivated and a voltage of the battery device 32 is supplied to the inverter circuit 40 so that the rectangular wave control is performed in the inverter circuit 40.

An operation region 84 is a region in which the voltage transducer 36 operates within a range up to the restriction upper limit voltage that is set below the normal upper limit value and a boost voltage within a range up to the restriction upper limit value is supplied to the inverter circuit 40 so that the PWM control is performed in the inverter circuit 40. In the above example, the normal upper limit voltage can be set to about 650 V and the restriction upper limit voltage to about 500 V. An operation region 86 is a region in which a boost voltage within a range up to the restriction upper limit voltage is supplied from the voltage transducer 36 so that the inverter circuit 40 performs the rectangular wave control.

An operation region 88 is a region in which the rotating electric device 24 is deactivated. This is a region generated because of a difference that the rotating electric device 24 operates below the normal upper limit voltage according to the normal operation condition map whereas it operates below the restriction upper limit voltage according to the restricted operation condition map. In the above example, the difference is a portion of the difference between a range within which the rotating electric device 24 is allowed to operate on the normal upper limit voltage of about 650 V and a range within which it is allowed to operate on the restriction upper limit voltage of about 500 V.

As has been described, when the eco-switch 42 is switched from OFF to ON, the operation region itself of the rotating electric device 24 becomes narrower by a size comparable to the operation region 88 of FIG. 3. Also, because the boost voltage upper limit value is reduced from the normal upper limit value to the restriction upper limit value, power consumption at the power supply circuit 30 and the rotating electric device 24 can be reduced. Moreover, as can be understood from a comparison between FIG. 2 and FIG. 3, the sine wave control region is wider in the normal operation condition map than in the restricted operation condition map. Conversely, the rectangular wave control region is wider in the restricted operation condition map than in the normal operation condition map. Accordingly, it becomes possible to compensate, to some extent, for torque that readily becomes insufficient when the eco-switch 42 is turned ON and the boost voltage upper limit value is reduced, by the rectangular wave control based on the restricted operation condition map.

Referring again to FIG. 1, the CPU 52 is formed by including a fuel-efficient running command determination module 60 that determines whether the eco-switch 42 is ON or OFF; that is, whether a fuel-efficient running command has been obtained; an operation condition switching module 62 that switches the operation condition of the rotating electric device on the basis of the ON or OFF state of the eco-switch 42; an engine state determination module 64 that determines a state of the engine 22; that is, whether it is in a start state or a stop state; an engine start delay permission determination module 66 that determines whether the start is to be delayed when the engine 22 is started; and a damping control module 68 that performs damping control when the engine 22 is started or stopped. These capabilities can be achieved by running a software program. More specifically, they can be achieved by running an eco-switch relevant control program in the vehicle control program. Part of these capabilities may be achieved by hardware.

Figure 4:
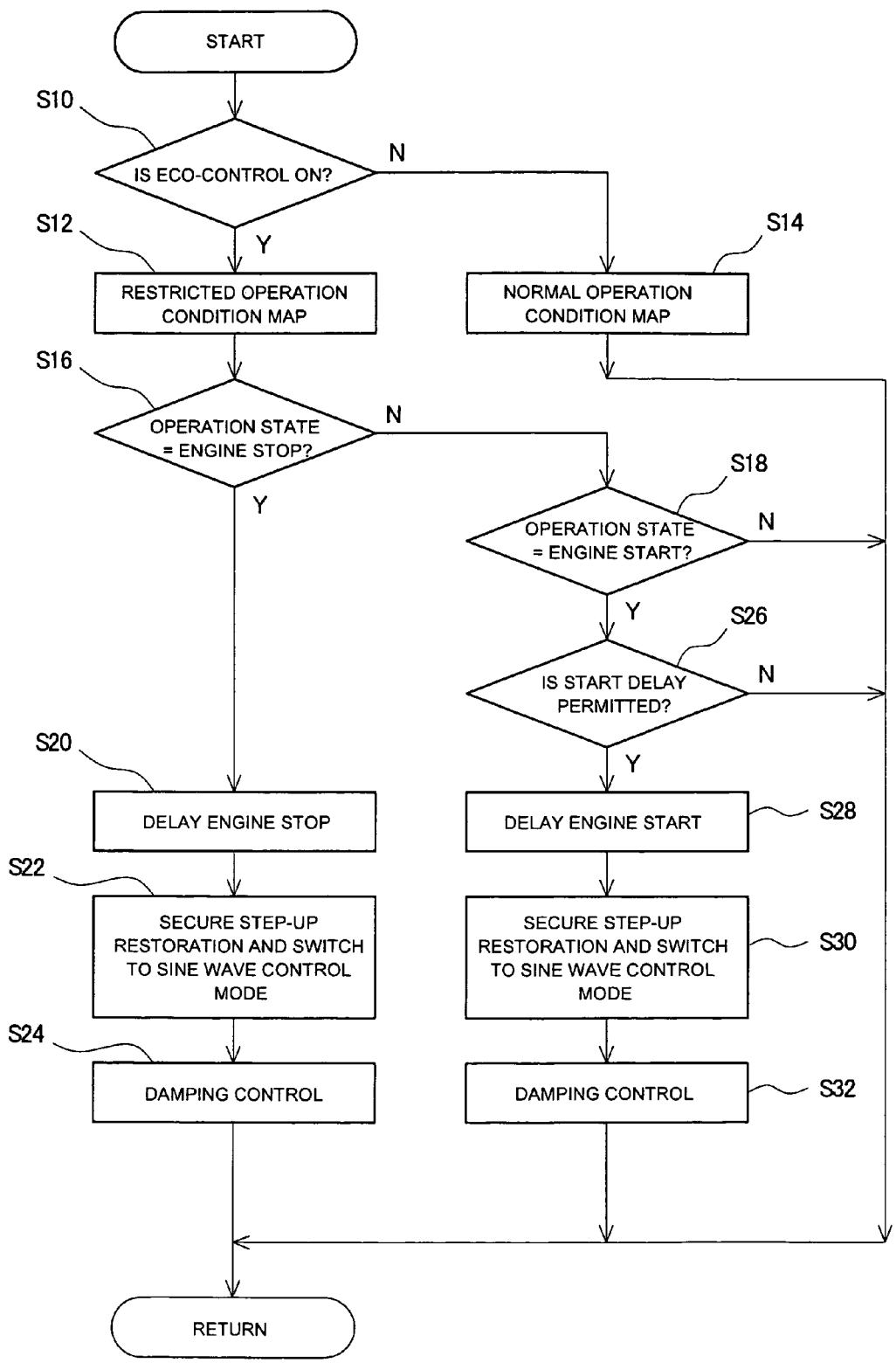
FIG. 4 is a flowchart depicting the steps of a process according to the embodiment of the invention.

Functions of the above configuration; in particular, the respective capabilities of the CPU 52 in the control element 50, will now be described in detail by reference to the flowchart of FIG. 4 and the time chart of FIG. 5. In the following, descriptions will be given using reference numerals of FIG. 1 through FIG. 3. FIG. 4 is a flowchart depicting the steps of a process relating to the control corresponding to the driving state of the vehicle when the eco-switch 42 is turned ON. The respective steps indicate the respective process steps in the eco-switch relevant control program in the vehicle control program.

Figure 5:
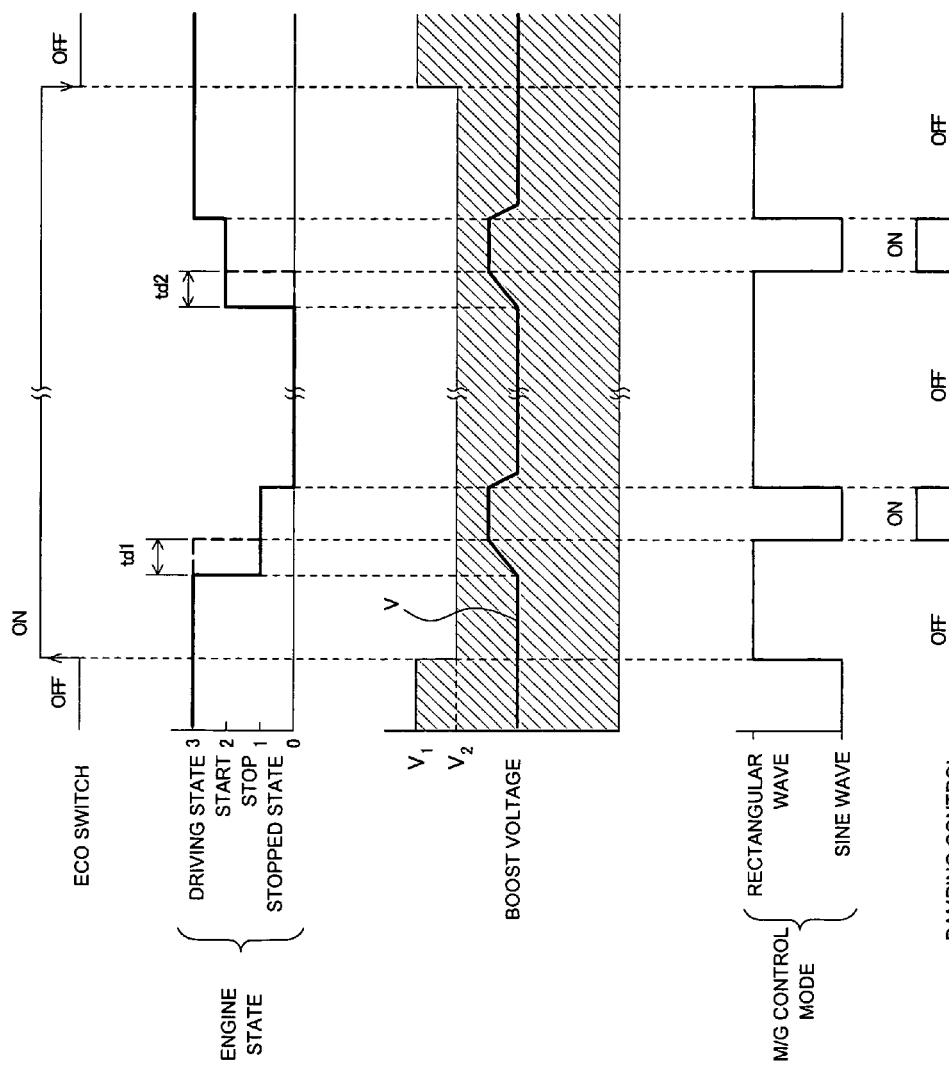
FIG. 5 is a time chart showing a variance with time in each state according to the embodiment of the invention.

FIG. 5 is a time chart showing variations with time in a state of the eco-switch 42; a state of the engine 22; a state of the boost voltage of the voltage booster 36 in the power supply circuit 30; a state of the control mode of the motor and generator (M/G), which is also a control state of the inverter circuit 40; and a state of the damping control in association with the flowchart of FIG. 4 and using a common time axis.

Referring to FIG. 4, in order to control a vehicle having the eco-switch 42, first, a determination is made as to whether the eco-control is ON (S10). This step is performed by the capability of the fuel-efficient running command determination module 60 in the CPU 52 of the control element 50. More specifically, a determination is made as to whether the eco-switch 42, with which a fuel-efficient running command from user is provided, is turned ON or OFF. In a case where the eco-switch 42 is ON, a determination is made that the eco-control is ON. In a case where the eco-switch 42 is OFF, it is determined that the eco-control is not ON.

When the eco-control is determined ON, the restricted operation condition map with the content described using FIG. 3 is selected as the operation condition map of the rotating electric device 24 (S12). Meanwhile, when it is determined that the eco-control is not ON, the normal operation condition map with the content described using FIG. 2 is selected as the operation condition map of the rotating electric device 24 (S14). The steps S12 and S14 are performed by the capability of the operation condition switching module 62 in the CPU 52. The data of the operation condition map necessary in this instance are read out from the memory device 54.

When the normal operation condition map is selected in S14, the eco-switch 42 is OFF as described above. In this instance, according to the driving state of the vehicle, the voltage transducer 36 boosts the voltage within a range up to the normal upper limit value in the power supply circuit 30 while the PWM control or the rectangular wave control is performed in the inverter circuit 40 according to the divided operation regions described by reference to FIG. 2.

When the restricted operation condition map is selected in S12, the upper limit value of the boost voltage is changed from the normal upper limit value to the restriction upper limit value in the voltage transducer 36 as described above. Also, the control mode is switched from the sine wave control to the rectangular wave control in the inverter circuit 40 as described by reference to FIG. 3. FIG. 3 shows that either the sine wave control or the rectangular wave control is selected according to the operation state of the rotating electric device 24. In actuality, however, the operation region 80 and the operation region 82 of FIG. 3 are set so that the operation region that is most likely to be taken when the eco-switch 42 is ON is under the rectangular wave control. Hence, in general, when the eco-switch 42 is turned ON, the operation condition map of the rotating electric device 24 is switched to the restricted operation condition map of FIG. 3 from the normal operation condition map of FIG. 2 and the control mode is switched from the sine wave control to the rectangular wave control.

FIG. 5 shows a manner in which the switching described above takes place. More specifically, at the timing at which the eco-switch 42 is switched from OFF to ON, the upper limit value of the boost voltage is reduced from the normal upper limit value $V_1$ to the restriction upper limit value $V_2$. As indicated by a thick solid line in FIG. 5, the actual boost voltage V is set within a range up to these upper limit values according to the driving status of the vehicle. In addition, the control mode of the inverter circuit 40 with respect to the rotating electric device 24 is switched from the sine wave control to the rectangular wave control.

Referring again to FIG. 4, when the restricted operation condition map is selected in S12, the state of the engine 22 is determined next. More specifically, a determination is made as to whether the operation state is an engine stop state (S16).

When it is not determined that the operation state is the engine stop state, a determination is made as to whether the operation state is an engine start state (S18). These steps are performed by the capability of the engine state determination module 64 in the CPU 52.

The determination in S16 that the operation state is the engine stop state is made upon receipt of an engine stop command. In order to suppress vibrations at the engine stop, the following steps are performed. Firstly, the engine 22 is not stopped immediately and instead an engine stop delay is performed so that the engine 22 stops completely after idling for a predetermined time. (S20). During a period of this engine stop delay, the actual boost voltage V of the voltage transducer 36 in the power supply circuit 30 is then boosted within a range up to the restriction upper limit value. The boost voltage V is boosted with a purpose to shift the operation state from the rectangular wave control region to the sine wave control region as shown in FIG. 2 and FIG. 3 (S22). When the operation state is shifted to the sine wave control region, the damping control is performed (S24). In short, the purpose of the engine stop delay is to secure a time for the rising restoration of the boost voltage that is necessary to change the control mode from the rectangular wave control to the sine wave control.

FIG. 5 shows that the engine state is divided into four states, and that the engine state goes through "1" representing a transient state when it shifts from "3" representing a driving state to "0" representing a stopped state, and in this instance a delay period $t_{d1}$ is provided. It also shows a manner in which the actual boost voltage V rises during this delay period $t_{d1}$ so that the control mode is switched from the rectangular wave control to the sine wave control at the timing at which the actual boost voltage has risen and the damping control is performed under the sine wave control.

The damping control is to suppress transient vibrations when the engine 22 is stopped. Accordingly, the damping control ends when the transient vibrations subside. As the damping control, there may be adopted a method for mitigating mechanical vibrations of the engine 22 by changing the magnitude of torque of the rotating electric device 24 in association with cycles, such as a cycle of the expansion and contraction strokes of the engine 22, as described above. In this manner, the process to suppress vibrations is performed when the engine 22 is stopped.

Referring to FIG. 4 once again, the determination that the operation state is the engine start in S18 is made upon receipt of an engine start command. In order to suppress vibrations at engine start, the following steps, similar in content to those described in relation to the case at engine stop, are performed.

Firstly, the engine 22 is not started immediately, and instead a determination is made as to whether a delay of the start of the engine 22 by a predetermined time is permitted (S26). This start delay is for securing a time for the step-up restoration as described in relation to S20.

A permission of the start delay is determined, because there is a case where an engine start command is given in order to protect the parts constituting the vehicle. In such a case, the engine 22 is started immediately by inhibiting a start delay. An example is a case where, in a vehicle in which the engine 22 is connected to two rotating electric devices with a planetary gear mechanism, one of the rotating electric devices reaches a high number of rotations due to slipping or the like while the engine 22 is stopped and the other rotating electric device reaches an abnormal number of rotations in a reverse direction by a function of the alignment chart of the planetary gear mechanism. In such a case, abnormal rotations can be prevented by performing the start of the engine 22. The rotating electric devices can therefore be protected from damage or the like.

When the start delay is permitted in S26, the start of the engine 22 is delayed by a predetermined time (S28). As with the case at engine stop, the actual boost voltage V of the voltage transducer 36 in the power supply circuit 30 is boosted within a range up to the restriction upper limit value during the engine start delay period, so that the operation state is shifted from the rectangular wave control region to the sine wave control region (S30). When the operation state is shifted to the sine wave control region, the damping control is performed (S32).

FIG. 5 shows that the engine state goes through "2" representing a transient state when it shifts from "0" representing the stopped state to "3" representing the driving state, and in this instance a delay period $t_{d2}$ is provided. The figure also shows a manner in which the actual boost voltage V rises during this delay period $t_{d2}$ so that the control mode is switched from the rectangular wave control to the sine wave control at the timing at which the actual boost voltage V has risen and the damping control is performed under the sine wave control. The damping control ends when the transient vibrations at the start of the engine 22 subside.

In this manner, vibrations can be suppressed in a case where the engine 22 is started or stopped while the eco-switch 42 is ON. It therefore becomes possible to perform control suitable to the driving state of the vehicle while the eco-switch 42 is ON.

Second Embodiment

The above description pertains to the case where the start of the engine is delayed by a predetermined delay time $t_{d2}$ when there is an engine start delay permission. Herein, the delay time can be set in response to the accelerator opening. For example, the delay time may be set shorter as the accelerator opening becomes larger. Herein, the delay time is varied continuously in response to the accelerator opening. Alternatively, a threshold opening may be set to the accelerator opening, so that a predetermined long delay time is set when the accelerator opening is equal to or smaller than the threshold opening and a shorter delay time is set when the accelerator opening exceeds the threshold opening. Herein, the delay time is set in two steps in response to the accelerator opening. It goes without saying that the delay time can be set in multiple steps; i.e., in more than two steps.

Figure 6:
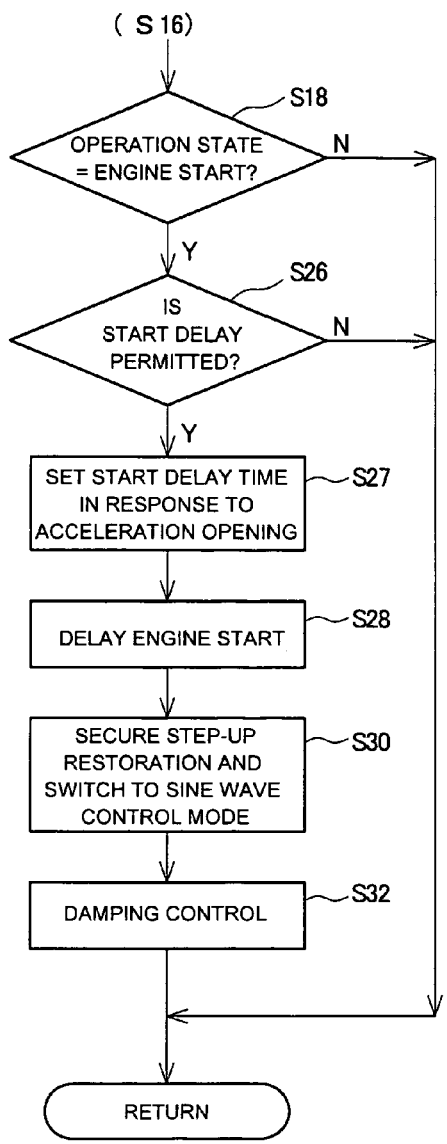
FIG. 6 is a flowchart depicting the steps of a process according to another embodiment.

FIG. 6 is a flowchart depicting the steps in a case where the start delay time is set in response to the accelerator opening. Because FIG. 6 is a flowchart identical with the flowchart of FIG. 4 except for a partial change, like step numbers are assigned to steps having like contents of FIG. 4 and detailed description of such steps are omitted herein. In FIG. 6, the steps up to S26 are the same as those in FIG. 4. In S26, when the start delay permission is acknowledged, the start delay time is set in response to the accelerator opening (S27). The start delay time may be varied continuously in response to the accelerator opening as described above, or different values in multiple steps may be set in response to the accelerator opening.

Figure 7:
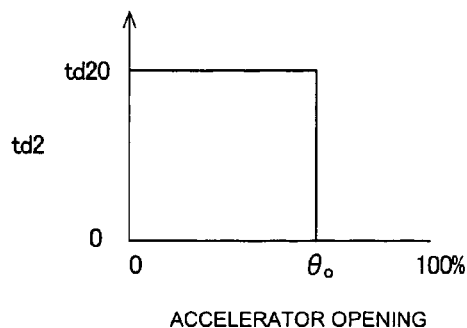
FIG. 7 is a view used to describe an example where a start delay time is set in response to the accelerator opening according to the other embodiment of the invention.

FIG. 7 shows an example of the setting of the start delay time $t_{d2}$. This example is to set the start delay time in two steps in response to the accelerator opening. In particular, when the accelerator opening exceeds the predetermined threshold opening, the start delay time is set to 0. More specifically, the threshold opening $\theta_0$ is set to the accelerator opening, so that a predetermined constant start delay time $t_{d20}$ is set when the accelerator opening is equal to or smaller than the threshold opening $\theta_0$ and the start delay time is set to 0 when the accelerator opening exceeds the threshold opening $\theta_0$. This configuration makes it possible to give higher priority to power performance than to damping performance when the accelerator opening is large.

In S28, the start of the engine is delayed under the delay condition set in Step S27. When the delay condition set in FIG. 7 is used, the start is not delayed when the accelerator opening exceeds the threshold opening $\theta_0$.

Third Embodiment

In the above case, a determination is made as to whether the start delay is permitted at the engine start when the eco-control is ON, and the start of the engine is delayed under the predetermined delay condition when the start delay permission is acknowledged. In addition, the stop of the engine is delayed at the engine stop when the eco-control is ON. In other words, the steps described above are performed independently of the operation state of the rotating electric device, so that the start of the engine is delayed or the stop of the engine is delayed. In practice, however, there is a case where the operation state of the rotating electric device is within the range of the sine wave control even when the eco-control is ON. In this case, the damping control can be performed directly without having to delay the start of the engine or the stop of the engine.

Figure 8:
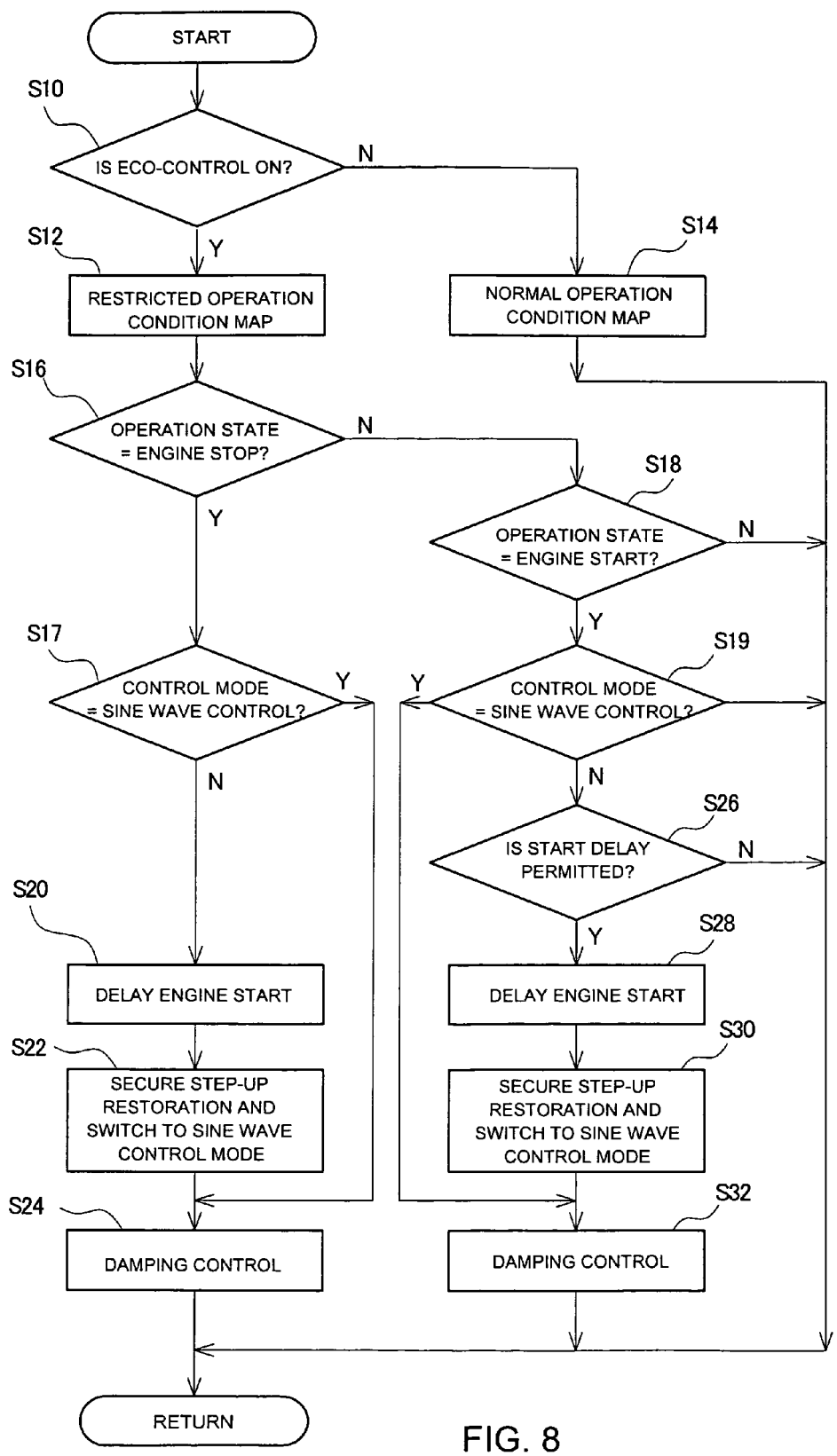
FIG. 8 is a flowchart depicting the steps of a process according to still another embodiment.

FIG. 8 is a flowchart depicting the steps when an operation state of the rotating electric device is determined so that the damping control is directly performed when the operation state is within the range of the sine wave control. Because FIG. 8 is a flowchart identical with that in FIG. 4 except for a partial change, like step numbers are assigned to steps having like contents of FIG. 4 and detailed description of such steps are omitted herein. In FIG. 8, steps up to S16 and S18 are the same as the steps in FIG. 4. When in S16 it is determined that the operation state is the engine stop, a determination is made as to whether the operation state of the rotating electric device is within the range of the sine wave control or within the range of the rectangular wave control (S17). When it is determined in S17 that the operation state of the rotating electric device is within the range of the sine wave control, the flow proceeds to S24 and the damping control is directly performed. When it is determined in S17 that the operation state of the rotating electric device is not within the range of the sine wave control but within the range of the rectangular wave control, the flow proceeds to S20 and the engine stop delay with the content described in relation to FIG. 4 is performed.

Likewise, when it is determined in S18 that the operation state is engine start, a determination is made as to whether the operation state of the rotating electric device is within the range of the sine wave control or within the range of the rectangular wave control (S19). When it is determined in S19 that the operation state of the rotating electric device is within the range of the sine wave control, the flow proceeds to S32 and the damping control is performed directly. When it is determined in S19 that the operation state of the rotating electric device is not within the range of the sine wave control but within the rectangular wave control, the flow proceeds to S26 and a determination is made as to whether the start delay with the content described using FIG. 4 is permitted. When the engine start delay is permitted in S26, the flow proceeds to S28 and the start of the engine is delayed. In this instance, as has been described in relation to FIG. 6 and FIG. 7, the start delay condition can be determined in response to the accelerator opening.

Figure 9:
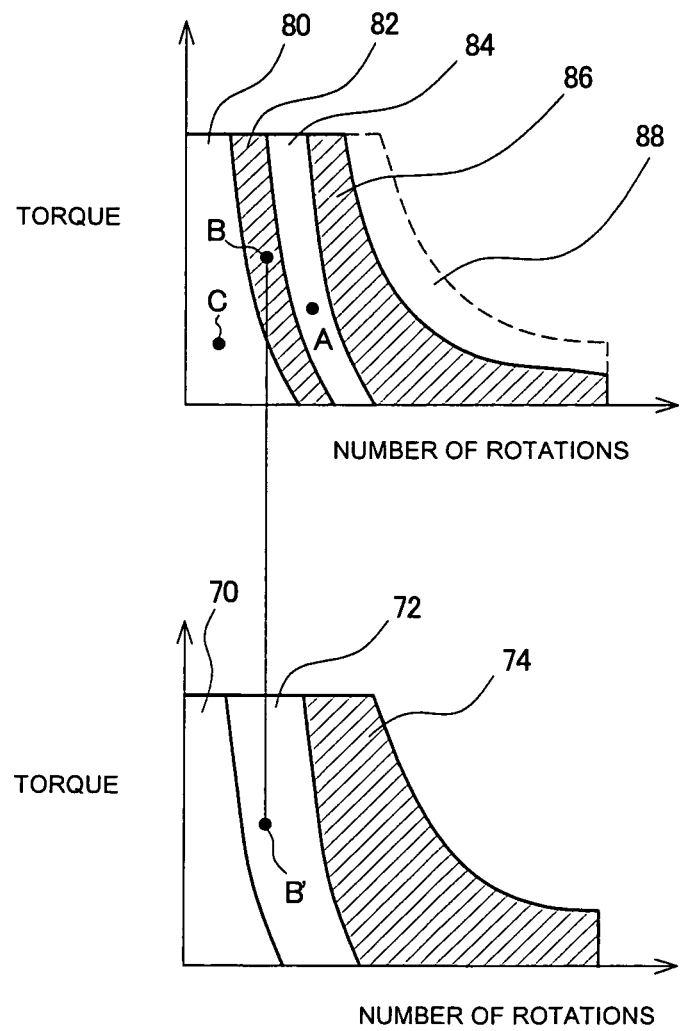
FIG. 9 is a view used to describe the content of the process of FIG. 8.

The operation state of the rotating electric device is determined in S17 and S19 by referring to the restricted operation condition map on the basis of the number of rotations and the torque of the rotating electric device. FIG. 9 shows a manner in which such reference is made. The top graph in FIG. 9 is a restricted operation condition map and is the same as the map shown in FIG. 3. The top graph in FIG. 9 shows three states A, B, and C as the operation state of the rotating electric device. The operation state A and the operation state C are within the range of the sine wave control. Meanwhile, the operation state B is not within the range of the sine wave control but is within the range of the rectangular wave control. As has been described, when the eco-control is ON, by making reference to the restricted operation condition map as to the operation state of the rotating electric device, it becomes possible to determine whether the operation state is within the range of the sine wave control.

The process steps of S17 and S19 in FIG. 8 will be described by reference to FIG. 9. In either S17 or S19, in a case where the rotating electric device is in the operation state A or the operation state C, the damping control is performed directly without having to make a determination as to a permission of the engine stop delay or the engine start delay (S24 or S32). In short, because the operation state is already within the range of the sine wave control, there is no need to return the operation state within the range of the sine wave control by the step-up restoration. Accordingly, the engine can be stopped or started within a short time.

Meanwhile, in a case where the rotating electric device is in the operation state B, a time for the step-up restoration is secured by making a determination as to the engine stop delay or the engine start delay, so that the operation state is switched to the operation condition according to the normal operation condition map. The bottom graph in FIG. 9 is a normal operation condition map and is the same as the map shown in FIG. 2. The operation state B in the top graph of FIG. 9 is shifted to the bottom graph of FIG. 9 while maintaining the running state intact and shifting to an operation condition B'. Herein, it is indicated that the operation condition B' is within the range of the sine wave control. As has been described, by temporarily switching the operation condition from operation according to the restricted operation condition map to operation according to the normal operation condition map, the operation state B within the range of the rectangular wave control is shifted to the operation state B' within the range of the sine wave control, which enables performance of the damping control.

Industrial Applicability

The vehicle control device and the control method of the vehicle control device of the invention can be used to control a vehicle having the rotating electric device when the vehicle is controlled according to a fuel-efficient running command from the user.

The invention claimed is:

1. A vehicle control device comprising:
a drive element having a rotating electric device and a power supply device which is connected to the rotating electric device and which includes a step-up converter that enables boosting a voltage of a battery device side and supplying the boosted voltage to a rotating electric device side;
an obtaining element to obtain a fuel-efficient running command from a user;
a memory device that stores a normal operation condition map of the rotating electric device for allowing the step-up converter in the power supply device to operate normally within a voltage range between the voltage of the battery device side and a normal upper limit voltage of the step-up converter and a restricted operation condition map of the rotating electric device for allowing the step-up converter to operate in a restricted manner within a voltage range between the voltage of the battery device side and a restriction upper limit voltage which is set below the normal upper limit voltage; and a control element that controls the drive element, wherein the control element includes:
- a fuel-efficient running command determination part to determine whether the fuel-efficient running command has been obtained; and
- a switching part to switch an operation condition of the rotating electric device between operation according to the restricted operation condition map when the fuel-efficient running command has been obtained and the operation according to the normal operation condition map when the fuel-efficient running command has not been obtained.

2. The vehicle control device according to claim 1, wherein:
the memory device stores as the normal operation condition map an operation condition map having a wider range of sine wave control than that of the restricted operation condition map, and as the restricted operation condition map, an operation condition map having a wider range of rectangular wave control than that of the normal operation condition map.

3. The vehicle control device according to claim 2, wherein the control element includes:
an engine start determination part to determine whether an engine start request has been issued while the fuel-efficient running command has been obtained; and
a start-time damping control part to, when the engine start request has been issued, perform damping control under the sine wave control as the operation condition of the rotating electric device according to the normal operation condition map by temporarily boosting an actual boost voltage of the step-up converter within a range up to a restriction upper limit value.

4. The vehicle control device according to claim 3, wherein:
the start-time damping control part determines, when the engine start request has been issued, whether an operation state of the rotating electric device is within the range of the rectangular wave control or within the range of the sine wave control, and when the operation state is within the range of the rectangular wave control, performs the damping control under the sine wave control as the operation condition of the rotating electric device according to the normal operation condition map by temporarily boosting the actual boost voltage of the step-up converter within the range up to the restriction upper limit value, and performs the damping control directly when the operation state is within the range of the sine wave control range.

5. The vehicle control device according to claim 3, wherein:
the control element includes a delay permission determination part to determine whether an engine start is to be delayed when the engine start request is issued while the fuel-efficient running command has been obtained; and
the start-time damping control part switches the operation condition of the rotating electric device using a predetermined delay condition that has been set in response to accelerator opening for an engine start when a delay is permitted by the delay permission determination part.

6. The vehicle control device according to claim 2, wherein the control element includes:
an engine stop determination part to determine whether an engine stop request has been issued while the fuel-efficient running command has been obtained; and
a stop-time damping control part to, when the engine stop request has been issued, perform the damping control under the sine wave control as the operation condition of the rotating electric device according to the normal operation condition map by temporarily boosting an actual boost voltage of the step-up converter within a range up to a restriction upper limit value.

7. The vehicle control device according to claim 6 wherein:
the stop-time damping control part determines, when the engine stop request has been issued, whether an operation state of the rotating electric device is within the range of the rectangular wave control or within the range of the sine wave control, and when the operation state is within the range of the rectangular wave control, performs the damping control under the sine wave control as the operation condition of the rotating electric device according to the normal operation condition map by temporarily boosting the actual boost voltage of the step-up converter within the range up to the restriction upper limit value, and performs the damping control directly when the operation state is within the range of the sine wave control.

8. The vehicle control device according to claim 6, wherein:
the stop-time damping control part switches the operation condition of the rotating electric device after an engine stop is delayed under a predetermined condition.

9. A vehicle drive control method performed by a control device that controls a drive element having a power supply device which is connected to a rotating electric device and which includes a set-up converter that enables a boosting voltage of a battery device side and supplying the boosted voltage to a rotating electric device side, the method comprising:
determining whether a fuel-efficient running command from a user has been obtained; and
referring to a memory device that stores a normal operation condition map of the rotating electric device for allowing the step-up converter in the power supply device to operate normally within a voltage range between the voltage of the battery device side and a normal upper limit voltage of the step-up converter and a restricted operation condition map of the rotating electric device for allowing the step-up converter to operate in a restricted manner within a voltage range between the voltage of the battery device side and a restriction upper limit voltage which is set below the normal upper limit voltage, and switching an operation condition of the rotating electric device between operation according to the restricted operation condition map when the fuel-efficient running command has been obtained and the operation according to the normal operation condition map when the fuel-efficient running command has not been obtained.

* * * * *